(12) United States Patent
You et al.

(10) Patent No.: US 7,996,322 B2
(45) Date of Patent: Aug. 9, 2011

(54) METHOD OF CREATING DOMAIN BASED ON PUBLIC KEY CRYPTOGRAPHY

(75) Inventors: Yong-kuk You, Suwon-si (KR); Myung-sun Kim, Uiwang-si (KR); Yang-lim Choi, Seongnam-si (KR); Yong-jin Jang, Uiwang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 2120 days.

(21) Appl. No.: 10/867,817

(22) Filed: Jun. 16, 2004

(65) Prior Publication Data

US 2005/0075986 A1   Apr. 7, 2005

(30) Foreign Application Priority Data

Oct. 1, 2003   (KR) .......................... 10-2003-0068364

(51) Int. Cl.
*G06F 21/00* (2006.01)
(52) U.S. Cl. ........................................................ 705/56
(58) Field of Classification Search .................... 705/56
See application file for complete search history.

(56) References Cited

U.S. PATENT DOCUMENTS

| | | | | |
|---|---|---|---|---|
| 5,949,877 A * | 9/1999 | Traw et al. ..................... | 713/171 |
| 5,963,646 A * | 10/1999 | Fielder et al. ................. | 380/259 |
| 6,513,117 B2 * | 1/2003 | Tarpenning et al. ........... | 713/156 |
| 6,550,011 B1 * | 4/2003 | Sims, III ....................... | 713/193 |
| 6,560,707 B2 * | 5/2003 | Curtis et al. ................... | 713/163 |
| 6,732,106 B2 * | 5/2004 | Okamoto et al. .............. | 707/100 |
| 7,222,104 B2 * | 5/2007 | Tadayon et al. ................ | 705/54 |
| 2002/0007454 A1 * | 1/2002 | Tarpenning et al. ........... | 713/156 |
| 2002/0114466 A1 * | 8/2002 | Tanaka et al. .................. | 380/232 |
| 2002/0146237 A1 * | 10/2002 | Safadi ............................ | 386/94 |
| 2002/0157002 A1 * | 10/2002 | Messerges et al. ............ | 713/155 |

(Continued)

FOREIGN PATENT DOCUMENTS

JP   2001-144744 A   5/2001

(Continued)

OTHER PUBLICATIONS xCP Cluster Protocol; IBM Presentation to Copy Protection Technical Working Group, Jul. 18, 2002. Pestoni, Florian. Available at <http://www.cptwg.org/Assets/Presentations/CPTWG%20-%20xCP-07-02.ppt>.*
IBM Response to DVB-CPT Call for Proposals for Content Protection & Copy Management: xCP Cluster Protocol. Oct. 19, 2001. Pestoni, Florian.*
Handbook of Applied Cryptography. Menezes et al. CRC Press, 1996. Available at <www.cacr.math.uwaterloo.ca/hac>. Chapter 8 included.*

(Continued)

*Primary Examiner* — Andrew J. Fischer
*Assistant Examiner* — Christopher C Johns
(74) *Attorney, Agent, or Firm* — Sughrue Mion, PLLC

(57) ABSTRACT

A method of creating a domain based on public key cryptography includes providing, by a content-providing server, a list of devices requesting content, and selecting, by a user, a device from the list; transmitting, by the server, discrimination information on revoked devices to the device; extracting, by the device having received the discrimination information, a secret value from the discrimination information, preparing a certificate using the extracted secret value, and transmitting device information and the certificate of the device to the server; verifying, by the server, the certificate and creating a domain ID and a domain key using the device information; encrypting, by the server, the domain ID and the domain key using a unique public key of the device and transmitting the encrypted domain ID and domain key to the device; and restoring, by the device, the domain key using a unique secret key of the device.

10 Claims, 3 Drawing Sheets

U.S. PATENT DOCUMENTS

| | | |
|---|---|---|
| 2002/0174354 A1 | 11/2002 | Bel et al. |
| 2002/0186844 A1 | 12/2002 | Levy et al. |
| 2003/0061206 A1 | 3/2003 | Qian |
| 2003/0133576 A1* | 7/2003 | Grumiaux ............... 380/279 |
| 2004/0103312 A1* | 5/2004 | Messerges et al. .......... 713/201 |
| 2005/0021942 A1* | 1/2005 | Diehl et al. ................. 713/158 |

FOREIGN PATENT DOCUMENTS

| | | |
|---|---|---|
| JP | 2002-279102 A | 9/2002 |
| JP | 2003-69560 A | 3/2003 |
| JP | 2003-69561 A | 3/2003 |
| JP | 2003-143121 A | 5/2003 |
| KR | 2001-0111374 A | 12/2001 |
| KR | 2003-0001362 A | 1/2003 |

OTHER PUBLICATIONS

"High-bandwidth Digital Content Protection System", Revision 1.0, Feb. 17, 2000. Available from <http://www.digital-cp.com>.*

Handbook of Applied Cryptography. Menezes,et al. CRC Press, 1997. Chapter 5 included. Available from <http://www.cacr.math.uwaterloo.ca/hac>.*

"Inside Windows Product Activation." Fully Licensed GmbH. Jul. 2001. Available from <licenturion.com/xp/fully-licensed-wpa.txt>.*

"IBM Response to DVB-CPT Call for Proposals for Content Protection & Copy Management: CP Cluster Protocol" Internet Citation (Online) Oct. 19, 2001, XP001148193, URL:http://www.almaden.ibm.com/software/ds/contentassurance/papers/xcp_dvb.p>.

* cited by examiner

METHOD OF CREATING DOMAIN BASED ON PUBLIC KEY CRYPTOGRAPHY

This application claims the priority of Korean Patent Application No. 10-2003-0068364 filed on Oct. 1, 2003, in the Korean Intellectual Property Office, the disclosure of which is incorporated herein in its entirety by reference.

BACKGROUND OF THE INVENTION

1. Field of Invention

Methods consistent with the present invention relate to creating a domain, and more particularly, to creating a unique domain based on public key cryptography to prevent content from being illegally used by unauthorized third persons.

2. Description of the Prior Art

Development in digital and communication technologies has served to popularize a variety of audio or video content. In line with the popularization of various content, a variety of techniques for protecting the content against illegal copying and unauthorized distribution have been proposed. In particular, there have been developed technologies by which content is encrypted and only particular devices can decrypt the encrypted content using predetermined rules. For example, the techniques include a DVD content scrambling system, a content protection for recordable media (CPRM), a digital transmission content protection (DTCP), a high definition content protection (HDCP), a content protection system architecture (CPSA), a digital rights management (DRM) and the like.

Specifically, with the development of the home network field, there have been proposed techniques for protecting content on a home network. Typical examples of the techniques include "SmartRight" proposed by Thomson Corporation, "OCCAM (Open Conditional Content Access Management" proposed by Sysco Corporation and "xCP (eXtensible Content Protection) Cluster Protocol" proposed by IBM Corporation.

"SmartRight" is a technique by which each of the devices constituting a home network has a smart card including a public key certificate and a key for the home network is created by the exchange of certificates among the devices using the smart cards.

"OCCAM" is a technique by which respective devices in a home can use content by using a unique "ticket" for each piece of the content.

"xCP Cluster Protocol" is a technique based on broadcast encryption, by which the concept of a domain called a "cluster" is employed and devices belonging to the same cluster can freely use content among the devices.

FIG. 1 is a flowchart schematically illustrating an example of a content reproducing process based on "xCP Cluster Protocol" in a home network.

Devices in the home network form a cluster that corresponds to the concept of a unique domain for a home network (100). Among the devices, a device that has a media key block (hereinafter referred to as "MKB") and can perform authorization for other devices to be registered with the cluster is called a "server."

If a consumer purchases a device capable of reproducing content and installs it at his/her home after the cluster has been formed, the device automatically determines which cluster currently exists in his/her home. Then, the device requests that the server belonging to the previously formed cluster authenticate the device itself (110).

If the server accepts the authentication request, the server encrypts content to be sent and then transmits the encrypted content to the device that has requested the authentication (120). Then, the device receives and decrypts the encrypted content (130).

FIG. 2 is a flowchart specifically illustrating an example of the content reproducing process based on "xCP Cluster Protocol" in the home network.

A server that first connects a given home network creates a binding ID (hereinafter referred to as "$ID_b$") for the home network (200). An $ID_b$ may be a unique identifier for a server established at the time of manufacture of the server or arbitrarily established by a user. When an $ID_b$ is so established, a cluster identified with $ID_b$ is formed.

When a device intends to use content present in the server, the device extracts a media key (hereinafter referred to as "$K_m$") from a MKB of the server by using its own device key set (210). Thereafter, the device creates its own unique key $K_p$ by using "$K_m$" extracted in step 210 and its own identifier $ID_p$ (212).

When the device intends to go through authorization, it requests the server to authorize the device itself (214). Specifically, the device sends its own unique "$ID_p$" ($ID_p$ derived using "$K_p$"), a "type" indicating the kind of device, and a hash value of the "type," i.e. h=MAC($ID_p$||type)$K_p$, to the server present in the cluster or an authorization server present outside the home network.

The server obtains $K_p'$ from $K_m$ and $ID_p$, and checks whether a hash value, h'=MAC($ID_p$||type)$K_p'$, which is obtained using $K_p'$, is identical to the value h already received from the device.

If it is determined that the value h is equal to the value h', the server sends the device E($ID_b$) $K_p$, which is obtained by encrypting $ID_b$ using $K_p$, and the unique identifier $ID_p$ of the device, and then adds $ID_p$ to an authorization table of the server, "auth.tab." The authorization for the device can be accomplished by extracting $ID_b$ from E($ID_b$) $K_p$ received from the server (216).

After the device authorization is completed, the server encrypts a content to be transmitted to the device (120). A binding key (hereinafter referred to as "$K_b$") is first created using $ID_b$, auth.tab and $K_m$ (220). Here, $K_b$ meets an equation, $K_b$=H[$ID_b$⊕H[auth.tab], $K_m$].

After $K_b$ is created, the server encrypts the content using a title key (hereinafter referred to as "$K_t$") for protecting the content (222). Meanwhile, each piece of content contains usage rule (UR) information including copy control information, information on whether the content is allowed to be distributed to the outside, a right to use the content, a valid use period, and the like. The UR information and $K_t$ are encrypted using $K_b$ to produce E($K_t$*⊕H[UR]$K_b$) (224).

Meanwhile, the device receives the "auth.tab" from the server, and $K_b$ is obtained from $K_b$=H[IDb⊕H[auth.tab], $K_m$] using the previously extracted $K_m$ and $ID_b$ (230). Further, after $K_t$ is extracted from E($K_t$⊕H[UR]$K_b$) (232), the content received from the server is decrypted using the extracted $K_t$ (234).

In the xCp Cluster Protocol operating as described above, all devices capable of communicating with the server can automatically join a domain without the process of selecting devices that will join the domain. Further, since $ID_b$ is fixed, the values of $K_b$, $K_p$, and the like can be calculated even when the device is put outside the domain. However, there is inconvenience in that whenever each device creates its new $K_b$, the device should receive the auth.tab from the server to calculate the new $K_b$. Accordingly, it is necessary to more securely protect content through construction of an independent home domain and involvement of a user in device authorization.

SUMMARY OF THE INVENTION

Although the present invention is conceived to solve the problems in the related art, embodiments of the present invention are not required to solve such problems. An object of the present invention is to provide a method of more securely creating a domain independent of the outside through direct involvement of a user in formation of the domain, and preventing content from being illegally used by an unauthorized third person.

According to the present invention for achieving the aforementioned exemplary object, there is provided a method of creating a domain based on public key cryptography, comprising a first step of providing, by a content-providing server, a list of devices requesting content and selecting, by a user, a device from the list; a second step of transmitting, by the server, information on discrimination of revoked devices to the selected device; a third step of extracting, by the device that has received the information, a secret value from the information, preparing a certificate using the extracted secret value, and transmitting device information and the certificate of the device to the server; a fourth step of verifying, by the server, the certificate and creating a domain ID and a domain key using the device information; a fifth step of encrypting, by the server, the domain ID and the domain key using a unique public key of the device and transmitting the encrypted domain ID and domain key to the device; and a sixth step of restoring, by the device, the domain key using a unique secret key of the device. At this time, the fourth step may comprise the steps of verifying the certificate and preparing an authentication list including the device information by the server; and creating the domain ID and the domain key using the device information and a random number generated by the server. Preferably, but not necessarily, the device information includes a device ID and the unique public key of the device.

BRIEF DESCRIPTION OF THE DRAWINGS

The above and other exemplary objects and features of the present invention will become apparent from the following description of an illustrative, non-limiting embodiment given in conjunction with the accompanying drawings, in which.

DETAILED DESCRIPTION OF THE INVENTION

Hereinafter, a method of creating a domain based on public key cryptography according to an illustrative embodiment of the present invention will be described in detail with reference to the accompanying drawings.

Meanwhile, for description of the present invention, it is assumed that each of a variety of devices, which may request a server providing content to provide the content to the device, has a set of its own unique secret keys and a public key or a public key creation function, assigned when it was manufactured. At this time, the set of secret keys may be used to extract secret values from a secret information block (hereinafter referred to as "SIB") provided by a method of broadcast encryption. The SIB corresponds to information for use in verifying whether revocation of devices will be made. The revoked devices cannot extract the secret values from the SIB, whereas legitimate devices can extract a common public key.

Figure 1:
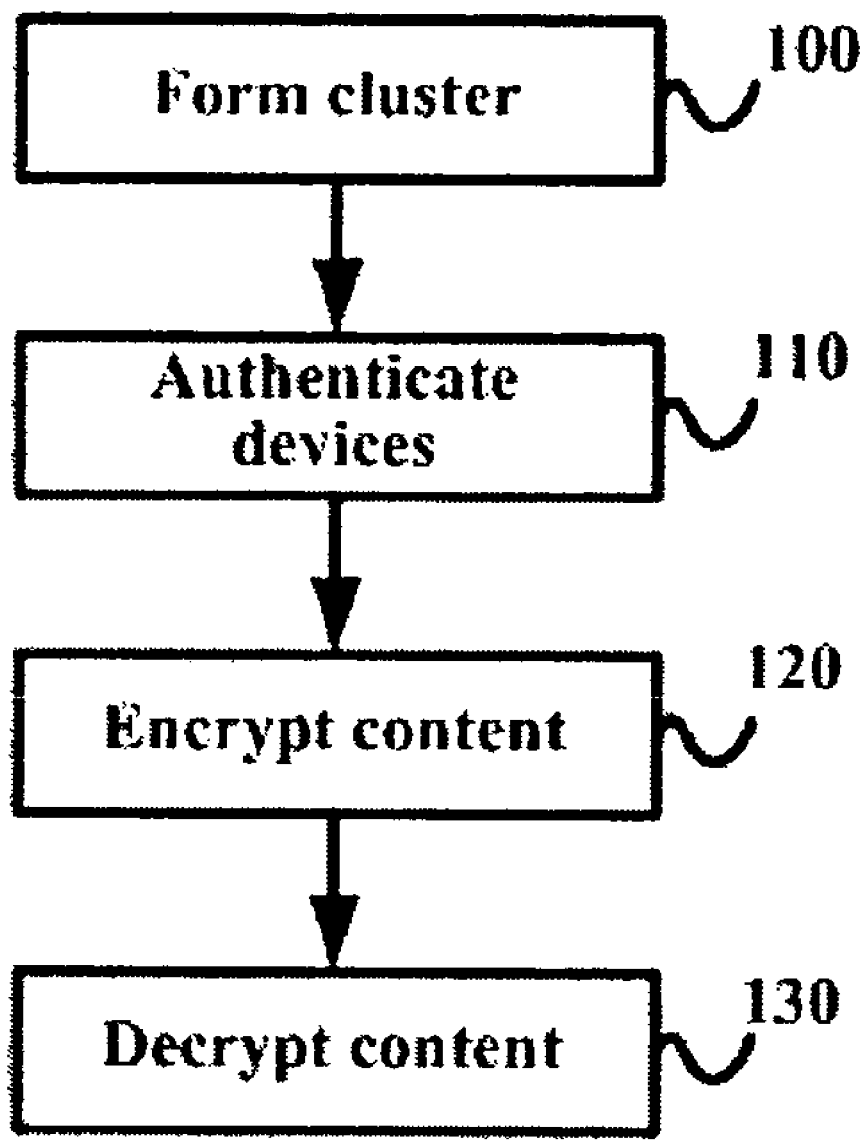
FIG. 1 is a flowchart schematically illustrating an example of a content reproducing process based on "xCP Cluster Protocol" in a home network.
Figure 2:
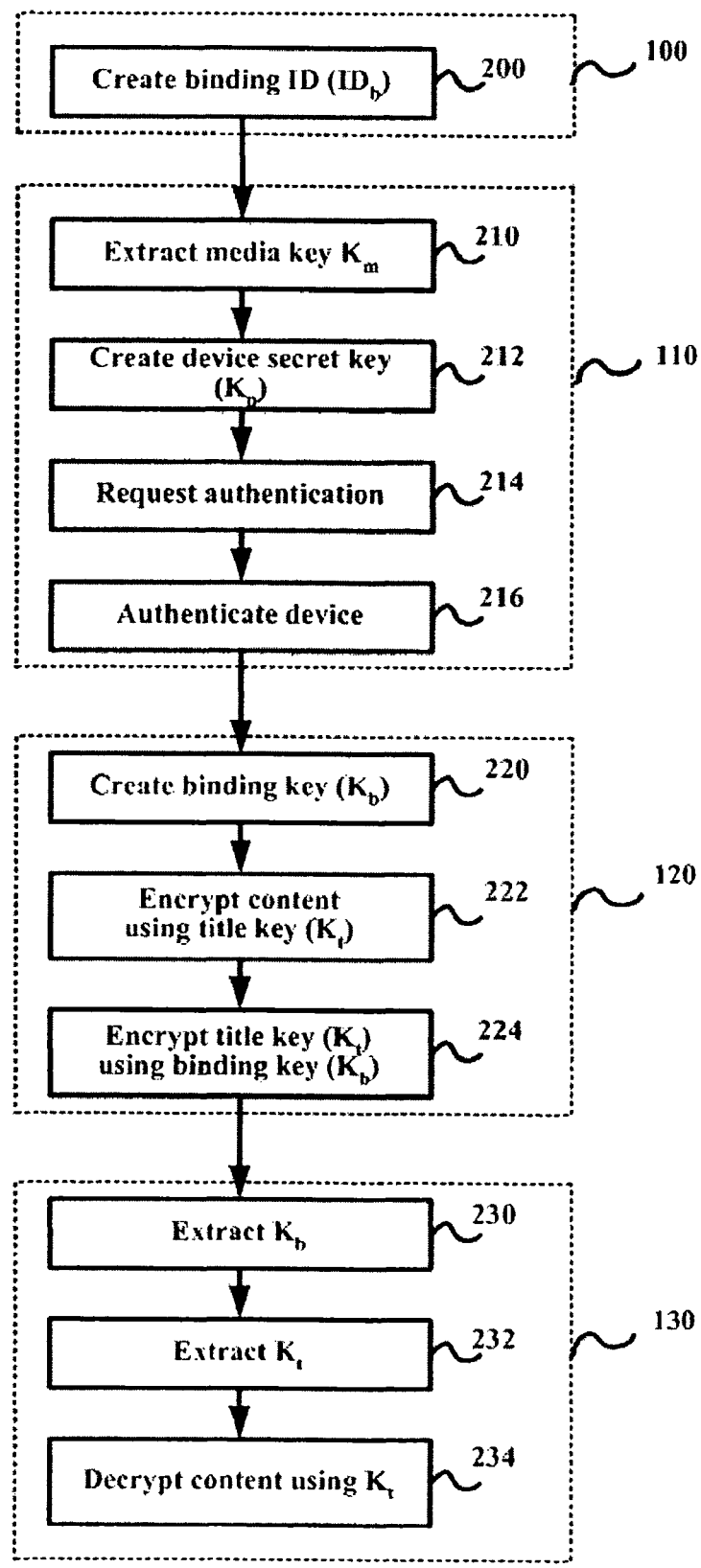
FIG. 2 is a flowchart specifically illustrating an example of the content reproducing process based on "xCP Cluster Protocol" in the home network.
Figure 3:
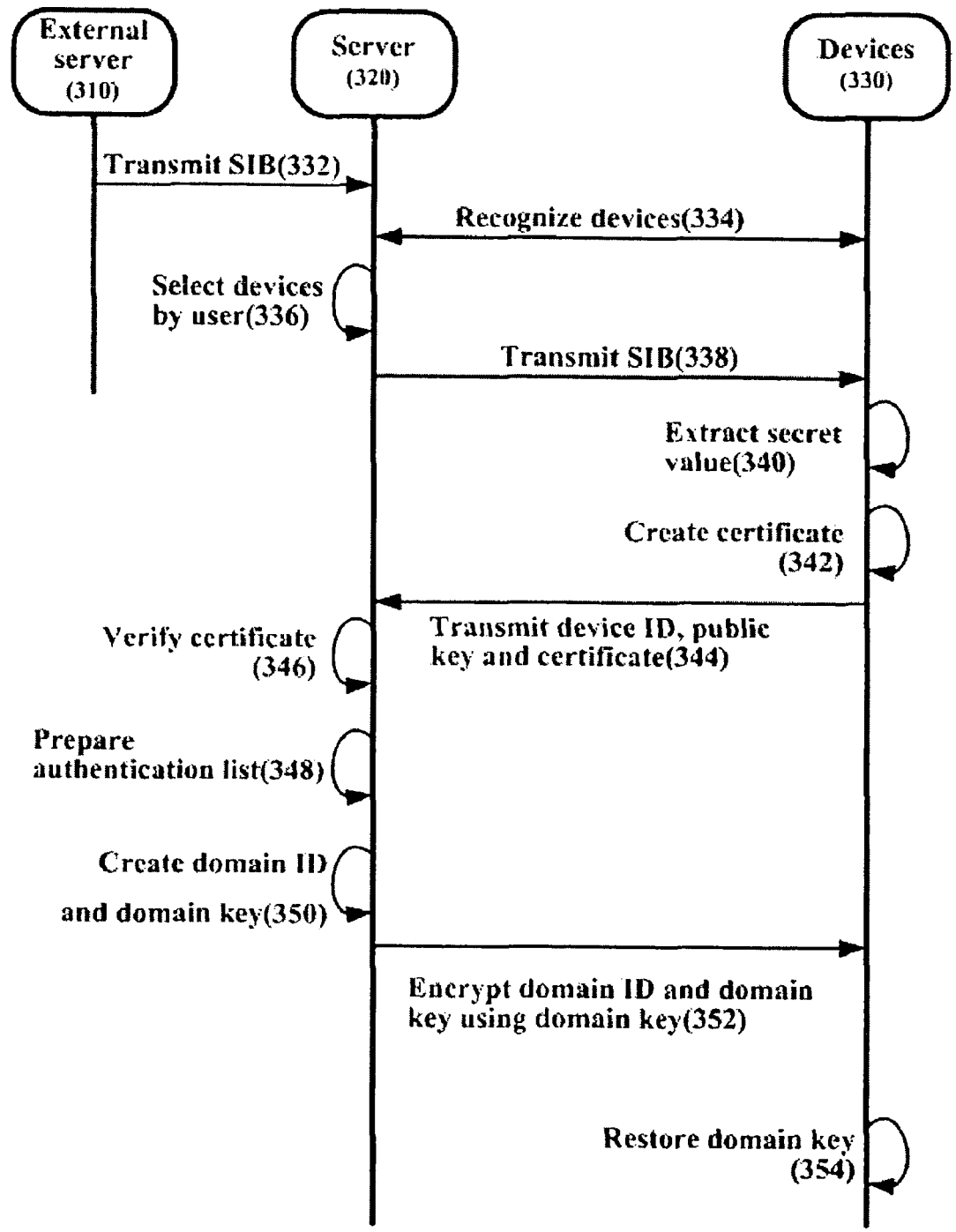
FIG. 3 is an exemplary view illustrating a method of creating a domain based on public key cryptography, according to the present invention.

FIG. 3 is an exemplary view illustrating a method of creating a domain based on public key cryptography, according to the present invention.

In a single domain, there is a server 320 involved in forming the domain. The server 320 receives a SIB from an external server 310 by a method of broadcast encryption manner (332). Thereafter, the server 320 can recognize the presence of devices 330 in the domain as the devices 330 inform the server that they exist in the domain through a wired or wireless network, or the server itself 320 finds the devices 330 (334).

When the server 320 provides a user with the devices, which have been recognized by the server, by displaying them on a display unit of the server, the user selects devices 330 that the user wants to register with the domain among the displayed devices (336). Then, the server 320 sends the SIB, which have been already received from the external server 310, to the devices 330 selected by the user (338). Each of the devices 330 that have received the SIB extracts a secret value from the SIB (340), and the extracted secret value is used to prepare a certificate capable of certifying whether the device is revoked (342). The certificate of the device is to certify that the device properly has extracted the secret value, which may be its own ID, an encrypted value of its own public key, or the like, from the SIB, thereby certifying that the device is a legitimate device.

When each of the devices 330 sends its own certificate, unique identifier (ID) and public key to the server 320 (344), the server 320 verifies the certificate in order to verify that the device is a legitimate device (346). Then, the server 320 prepares an authorization list in which unique identifiers (IDs) and public keys of authenticated devices are recorded (348). The number of devices that can be authenticated is limited by a content provider.

Alternatively, the server 320 first transmits a SIB to devices recognized by the server and then verifies certificates of the devices 330 that have prepared the certificates. Thereafter, the server provides the user with the recognized devices and the verification results through the display unit of the server, and then, the user can select devices to be included in the domain among the authenticated devices so that the server can prepare an authentication list including only the selected devices.

After the server 320 prepares the authorization list, the server creates a unique domain ID and a domain key using information on the devices included in the authentication list and a random number created by the server itself (350). The domain ID is created using a unique value for the server and the authentication list, and respective servers may have different domain IDs even in the same domain. In addition, the domain ID is used as a discriminator for distinguishing a domain from other domains. The domain key is a secret key shared among those devices only belonging to a domain formed by the user's selection and is unpredictably changed whenever there are changes in members constituting the domain.

The server 320 encrypts the domain ID and the domain key by use of respective public keys of the authenticated devices 330 present in the domain and then transmits the encrypted domain ID and domain key to the authenticated devices 330

(352). The devices 330 restore the domain key using their own secret keys (354). Thus, the domain for using the content is finally formed.

When the domain for sharing the content is formed, the server 320 encrypts the content using a content key which is in turn encrypted using the domain key. The devices, which want to use the content, decrypt the encrypted content using the domain key, to thereby use the content.

With the method of creating a domain based on public key cryptography according to the present invention, a user can be directly involved in creating a domain, thereby constructing a domain independent of the outside. In addition, since the domain key is created using the authorization list and the random number as input values, the domain key is also changed whenever there are changes in devices present in the domain. Thus, there is an advantage in that the use of content can be more securely limited.

Although the present invention has been described in connection with the embodiments illustrated in the drawings, it will be apparent to those skilled in the art that various substitutions, modifications and changes may be made thereto without departing from the technical spirit and scope of the invention. Thus, the present invention is not limited to the illustrative embodiments described herein and the accompanying drawings.

What is claimed is:

1. A method of creating a domain based on public key cryptography, comprising:
    providing, by a content-providing server, a list of one or more devices requesting content,
    selecting, by a user, a device from the list;
    transmitting, by the content-providing server, information on discrimination of one or more revoked devices including a secret value to the selected device;
    extracting, by the selected device, the secret value from the received information,
    preparing, by the selected device, a certificate using the extracted secret value,
    transmitting, by the selected device, device information and the certificate of the selected device to the content-providing server;
    verifying, by the content-providing server, the certificate,
    creating, by the content-providing server, a domain ID and a domain key using the device information;
    encrypting, by the content-providing server, the domain ID and the domain key using a unique public key of the selected device;
    transmitting, by the content-providing server, the encrypted domain ID and domain key to the selected device; and
    decrypting, by the selected device, the domain key using a unique secret key of the selected device.

2. The method as claimed in claim 1, wherein the step of verifying the certificate and creating the domain ID and the domain key comprises:
    verifying the certificate and preparing an authentication list including the device information by the content-providing server; and
    creating the domain ID and the domain key using the device information and a random number generated by the content-providing server.

3. The method as claimed in claim 1, wherein the device information includes a device ID and the unique public key of the selected device.

4. The method as claimed in claim 2, wherein the device information includes a device ID and the unique public key of the selected device.

5. A method of creating a domain based on public key cryptography, comprising:
    transmitting, by a content-providing server, discrimination information on discrimination of revoked devices including one or more secret values to one or more devices that have recognized the content-providing server;
    extracting, by each of the devices that have received the discrimination information, the one or more secret values from the discrimination information,
    preparing by each of the devices their own certificates using a respective one of the extracted secret values,
    transmitting by each of the devices that have received the discrimination information, device information and the certificates to the content-providing server;
    verifying, by the content-providing server, the certificates of the devices;
    providing a user with a list of the recognized devices and a list of authentication results for the devices;
    selecting, by the user, one or more devices to put in the domain from among the authenticated devices;
    preparing, by the content-providing server, an authentication list based on the selected devices and device information on the selected devices;
    creating, by the content-providing server, a domain ID and a domain key using the device information included in the authentication list;
    encrypting, by the content-providing server, the domain ID and the domain key using unique public keys of the selected devices;
    transmitting the encrypted domain ID and domain key to the selected devices; and
    decrypting, by the selected devices, the domain key using unique secret keys of the selected devices.

6. The method as claimed in claim 5, wherein the step of creating the domain ID and the domain key comprises creating the domain ID and the domain key using the device information and a random number generated by the server.

7. The method as claimed in claim 5, wherein the device information, for each of the selected devices, includes the device's ID and the device's unique public key.

8. The method as claimed in claim 6, wherein the device information, for each of the selected devices, includes the device's ID and the device's unique public key.

9. A method of sharing a content in a domain, comprising:
    the method of creating a domain based on public key cryptography as claimed in claim 1, encrypting, by the content-providing server, the content, using a content key and the domain key, and transmitting the content to the selected device, and
    decrypting, by the selected device, the encrypted content using the domain key.

10. A method of sharing a content in a domain, comprising:
    the method of creating a domain based on public key cryptography as claimed in claim 5, encrypting, by the content-providing server, the content, using a content key, and transmitting the content to the selected devices, and
    decrypting, by the selected devices, the encrypted content using the domain key.

* * * * *